United States Patent [19]
Gerlovich

[11] 3,844,401
[45] Oct. 29, 1974

[54] CONVEYOR WITH MAGNETIC ARTICLE HOLDING MEANS
[75] Inventor: Albert F. Gerlovich, Fanwood, N.J.
[73] Assignee: Rheem Manufacturing Company, New York, N.Y.
[22] Filed: Jan. 15, 1973
[21] Appl. No.: 323,505

Related U.S. Application Data
[62] Division of Ser. No. 126,201, March 19, 1971, Pat. No. 3,741,149.

[52] U.S. Cl. ............................................... 198/41
[51] Int. Cl. .......................................... B65g 17/46
[58] Field of Search ..................................... 198/41

[56] References Cited
UNITED STATES PATENTS
2,643,778  6/1953  Socke ................................ 198/41
2,687,202  8/1954  Nordquist ......................... 198/41
2,775,335  12/1956  Simpson ........................... 198/41
2,868,141  1/1959  Griner ............................... 198/41
2,920,739  1/1960  Woldin .............................. 198/41
2,940,584  6/1960  Kurz ................................. 198/41

Primary Examiner—Richard E. Aegerter
Attorney, Agent, or Firm—Watson, Leavenworth, Kelton & Taggart

[57] ABSTRACT

A turret type conveyor machine for metal bodies to be spray coated, the turret having pockets for holding the bodies provided with magnetic means adapted to restrain the bodies, and the machine having cam means for automatically retracting the magnetic means at an advanced station to release the bodies.

5 Claims, 3 Drawing Figures

CONVEYOR WITH MAGNETIC ARTICLE HOLDING MEANS

This application is a division of application Ser. No. 126,201 filed Mar. 19, 1971, now U.S. Pat. No. 3,741,149 issued June 26, 1973.

Turret type machines for automatically spraying the interior of containers have been known for many years. The patents to March U.S. Pat. No. 2,103,270 and Eberhart U.S. Pat. No. 2,189,783 are illustrative. Each discloses an automatic spraying machine having a rotary turret with arc-shaped pockets in which cans are positioned as the turret is indexed to successive stations including the spraying station. Electrical circuitry is provided for automatically controlling the events of the cycle. In the case of these two patents the articles are rotated and the spray heads are non-rotary. The patent to Makowski et al. U.S. Pat. No. 3,044,894 is an example of a rotary indexing turret type spraying machine in which the spray head is rotary and is mounted on a vertical reciprocatory slide and automatic controls are provided particularly for the paint valve. The patent to Roe U.S. Pat. No. 3,447,946 and McClughan U.S. Pat. No. 3,525,314 are examples of spraying machines in which the articles are indexed in a straight line relative to the spray mechanism. The patent to Hazlett U.S. Pat. No. 3,252,442 discloses a machine in which a metal shell to be sprayed is elevated by a pair of vertically moved magnets which engage the drum, the magnets being deenergized when the drum is lowered to the original position.

The present application is concerned with improvements in a conveyor system for metal bodies of the indexing type, particularly the rotary turret type having pockets for holding the metal body, there being provided a magnetic means for temporarily grasping the metal body and restraining it in the pocket and mechanical means for positively releasing the magnetic means in an advanced station.

The invention comprises in particular a conveyor of the rotary indexing type with power means to drive the conveyor, the turret having pockets adapted to receive therein a metal body such as a cylindrical drum shell. The conveyor has pivotally mounted thereon an arm which carries one or more magnets, and a spring is connected to urge the magnetic means toward the body to restrain it within the respective opening. A stationary cam engageable by a part on the arm in the advance of the conveyor serves to swing the arm to retract positively the magnet from the body whereby the body is free.

The novel features and principles of the invention and the advantages will be made more apparent from a consideration of a particular embodiment thereof as described hereinafter and illustrated in the drawings, in which.

Figure 1:
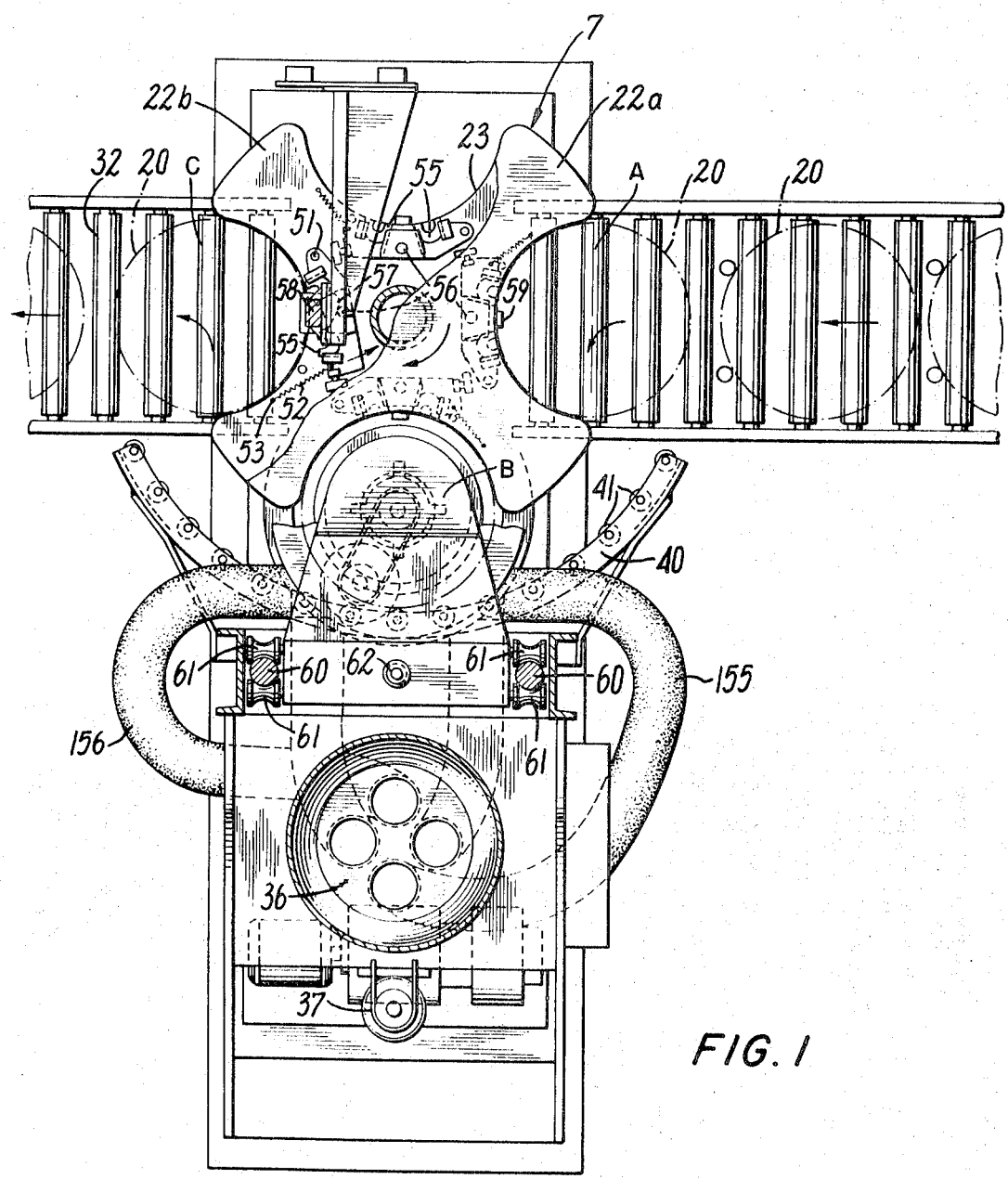
FIG. 1 is a plan view showing the major elements and arrangement of the machine.
Figure 2:
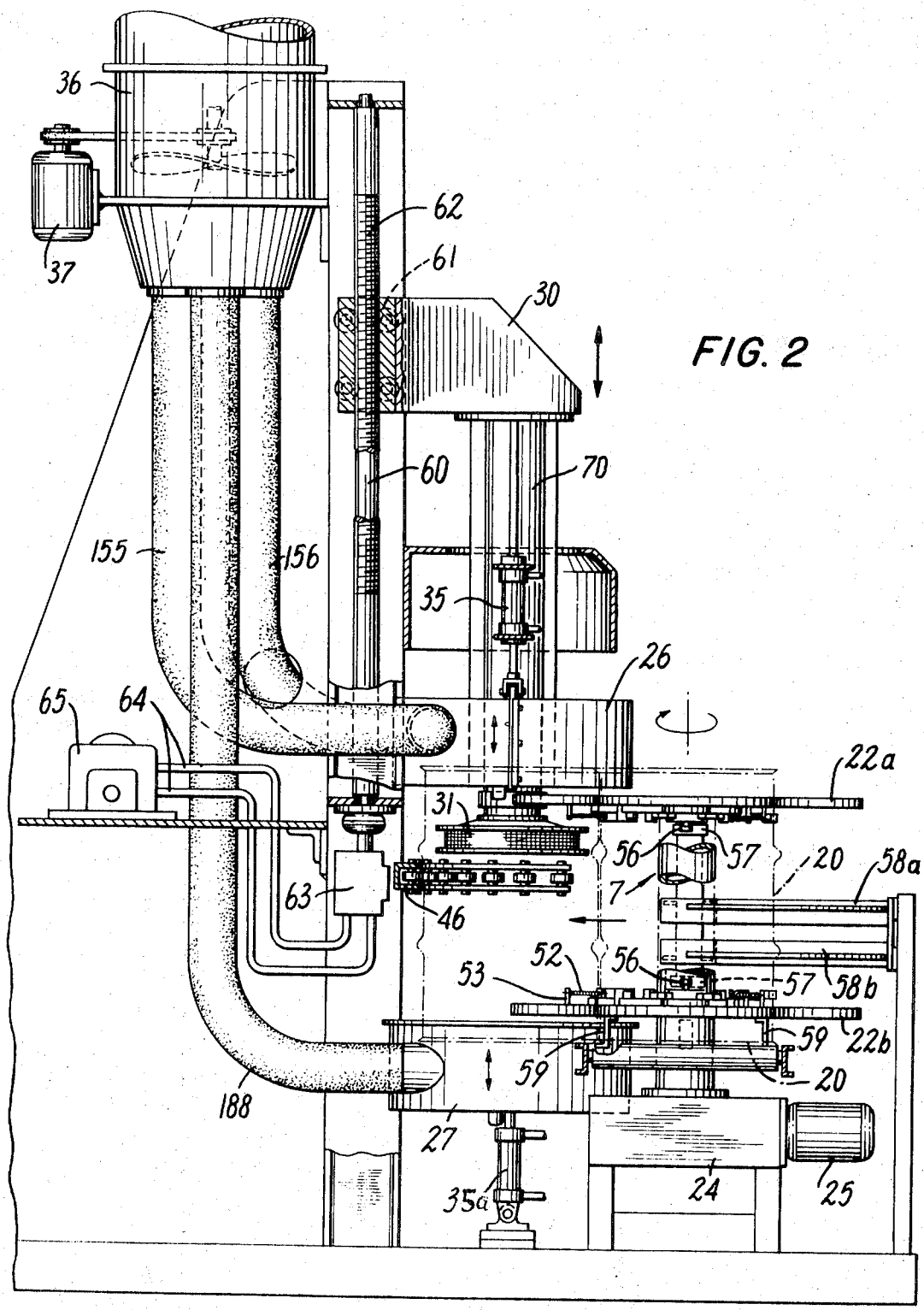
FIG. 2 is a vertical view looking from the right in FIG. 2.

For the general features of the machine embodying the invention of this divisional application reference is made to FIGS. 1 and 2. With minor structural variations the machine is adapted to the spraying of the interior of different hollow shells and like articles such as drum shells or pail bodies, the particular articles illustrated being drums 20 open at both ends. The spray material will depend upon the circumstances but may be referred to as paint. The drums are advanced on a roller conveyor 21 to Station A of the spray machine which embodies a turret with top and bottom discs 22a and 22b respectively. The discs have concave pockets 23 into which the drums fit. From Station A the drums are indexed clockwise in FIG. 1 to Station B. The indexing mechanism indicated generally at 24 to FIG. 2 may be of a known type such as a Geneva type driven by motor 25.

At Station B top and bottom shrouds 26 and 27 advance over the top and bottom ends respectively of the drums 20. A main head or slide 30 carrying a rotary centrifugal spray head then travels down and back during which the interior of the drum is sprayed, after which the shrouds 26 and 27 are retracted and the drum is indexed to Station C where it is released and moved away on roller conveyor 32. The head 30 is supported and guided on a pair of spaced vertical gibs 60 each gib being engaged by a pair of opposed rolls 61 (FIG. 1) mounted in the head 30, the head being traversed up and down by feed screw 62 operated by a reversible rotary hydraulic motor 63 through pipes 64 connected with pump 65.

Translation of the shrouds is effected through air cylinder and piston means automatically controlled. The cylinder for the upper shroud 26 being indicated at 35 the air being controlled through a suitable valve, and the cylinder 35a for the lower shroud 27 being similarly controlled. Each of the shrouds is connected to a suction fan 36 operated by electrical motor 37 the details of the conducting passages being described more fully in said application Ser. No. 126,201 but for the present purpose it may be noted in general that the flexible pipes 155 and 156 connect the shroud 26 with suction fan 36 and flexible pipe 188 appearing in FIG. 2 connects the shroud 27 to the suction fan.

Figure 3:
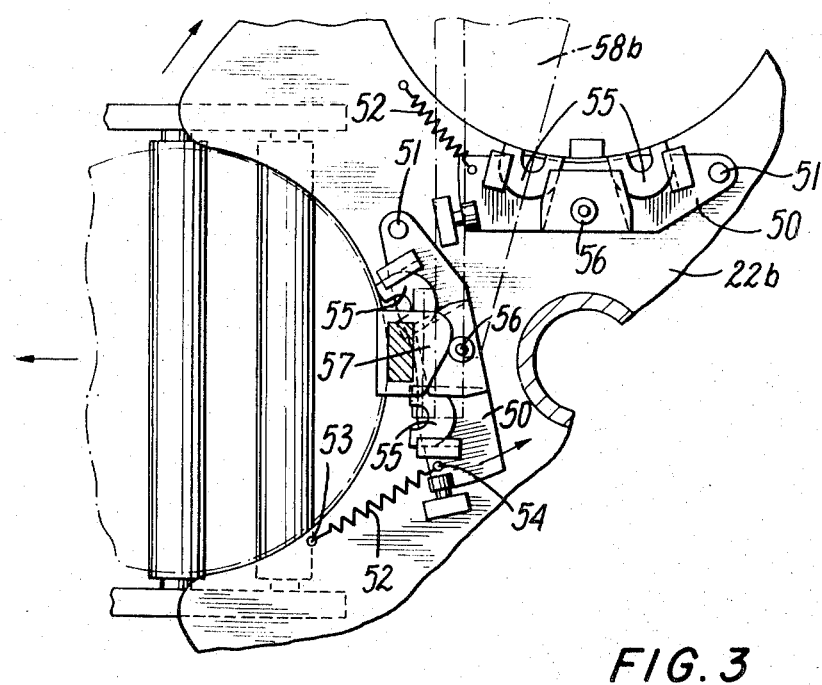
FIG. 3 is a fragmentary view showing on an enlarged scale the magnetic means for holding the shells in the turret pockets.

To maintain the drums within the pockets 23 of the turret against particularly the centrifugal force acting thereon during the intermittent rapid angular shifting magnetic means are associated with each of the turret discs 22a and 22b for releasably holding any body of paramagnetic material such as the steel drums in the present embodiment. In addition an arc-shaped outer wall 40 extends around the turret provided with rollers 41 along which the drums ride. Referring more specifically to the magnetic means, for the lower disc 22b the elements are mounted on the upper surface thereof there being a pivoted magnet at each pocket 23. In FIG. 1 the upper disc 22a is broken away to show the magnetic means mounted on the upper surface of lower disc 22b, but the details appear more fully in FIG. 3. The means includes a lever 50 pivoted at 51 urged clockwise in FIG. 3 by spring 52 fastened at one end at 53 to the turret plate and at the other end at 54 to the lever 50. The magnetic means may comprise electromagnets or permanent magnets the latter being here employed and comprising two horseshoe magnets 55 mounted on lever 50 adapted to contact the drum 20 and hold it during the angular travel of the turret from the drum pick up Station A to the spray Station B and on to the drum exit Station C where a roller 56 on lever 50 contacts a stationary cam 57 forcing the magnets free of the drum permitting free removal of the drum on the inclined roller conveyor 32. Similar magnetic means are positioned on the lower surface of upper turret plate 22a at each of the pockets 23. The cams 57 may be suitably mounted on any fixed support comprising here an arm 58a for the cam for the upper turret plate 22a (FIG. 2) and an arm 58b for the lower turret plate 22b.

To aid in holding the drums from sliding down in the turret head the bottom turret plate has a downwardly extending hook 59 at each concave notch pocket 23 which engages under the bottom edge of the drum.

Since various changes may be made as to details of the magnetic means and different embodiments made thereof within the principles of the invention, it is intended that all matter contained herein shall be interpreted as illustrative and not in a limiting sense.

What is claimed is:

1. In an article conveyor machine, a movably mounted conveyor, a source of power connected to drive said conveyor, said conveyor having an opening adapted to receive therein a metal body, an arm pivoted on the conveyor, a magnet carried by said arm, a spring connected to urge the magnet toward the body to restrain the body within said opening, and means for releasing the body at an advanced position comprising a stationary cam, and a part on said pivoted arm engageable with said cam in the movement of the conveyor to swing the arm and retract positively the magnet from the body.

2. A conveyor machine in accordance with claim 1 in which the conveyor is a rotary turret.

3. A conveyor machine in accordance with claim 2 in which the turret has pocket openings in the periphery and is rotatable relative to a body supply station, a spray station and an advanced release station, and the magnet is effective to grasp the body at the supply station and the means for releasing the magnet is positioned at said release station.

4. A conveyor machine in accordance with claim 1 in which said arm carries a roller engageable with said cam which is shaped to swing the arm and magnet away from the cam.

5. A conveyor machine in accordance with claim 1 in which the conveyor has a series of said openings for the bodies with a magnet at each of the openings movable with the conveyor, said means for releasing the bodies being common to all of the openings and adapted to be contacted by the respective pivoted arm part successively.

* * * * *